United States Patent
Hueber et al.

(10) Patent No.: US 9,935,689 B2
(45) Date of Patent: Apr. 3, 2018

(54) METHOD AND SYSTEM TO MEASURE THE PHASE OFFSET BASED ON THE FREQUENCY RESPONSE IN A NFC SYSTEM

(71) Applicant: NXP B.V., Eindhoven (NL)

(72) Inventors: Gernot Hueber, Linz (AT); Ian Thomas Macnamara, Graz (AT); Johannes Bruckbauer, Treubach (AT); Hubert Watzinger, Gratwein-Strassengel (AT)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 15/225,767

(22) Filed: Aug. 1, 2016

(65) Prior Publication Data
US 2018/0034510 A1   Feb. 1, 2018

(51) Int. Cl.
*H04B 5/00* (2006.01)
*H04B 17/21* (2015.01)
*H04B 17/318* (2015.01)

(52) U.S. Cl.
CPC ......... *H04B 5/0056* (2013.01); *H04B 5/0075* (2013.01); *H04B 17/21* (2015.01); *H04B 17/318* (2015.01)

(58) Field of Classification Search
CPC ................................. H04B 5/056; H04B 17/21
See application file for complete search history.

(56) References Cited

U.S. PATENT DOCUMENTS

| | | | |
|---|---|---|---|
| 5,574,470 A | 11/1996 | De Vall | |
| 7,098,770 B2 | 8/2006 | Charrat et al. | |
| 7,667,572 B2 | 2/2010 | Husak et al. | |
| 7,712,672 B2 | 5/2010 | Takahashi et al. | |
| 7,764,236 B2 | 7/2010 | Hill et al. | |
| 7,876,284 B2 | 1/2011 | Mizoroki et al. | |
| 8,261,997 B2 | 9/2012 | Gebhart | |
| 8,461,993 B2 | 6/2013 | Mickle et al. | |
| 8,466,791 B2 | 6/2013 | Goto et al. | |
| 8,472,560 B2 | 6/2013 | Rezayee et al. | |

(Continued)

FOREIGN PATENT DOCUMENTS

| | | |
|---|---|---|
| CN | 103269220 A | 8/2013 |
| EP | 2680457 A2 | 1/2014 |
| EP | 2 988 427 A1 | 2/2016 |

OTHER PUBLICATIONS

European Search Report, 16200455, Mar. 28, 2017.

(Continued)

*Primary Examiner* — Tuan H Nguyen

(57) ABSTRACT

The present invention provides for a method and system for compensating phase offset caused by a matching network and antenna of a communications device. The method comprises: generating a mapping that correlates phase offset with a characteristic parameter; measuring the characteristic parameter for the communications device; using the measured characteristic parameter and the mapping to determine a phase offset for the communications device; and using the determined phase offset to compensate for the phase offset caused by the matching network and antenna of the communications device. The present invention also provides for a method and system for measuring a phase offset caused by a matching network and antenna of a communications device.

17 Claims, 8 Drawing Sheets

(56) References Cited

U.S. PATENT DOCUMENTS

| | | |
|---|---|---|
| 8,947,212 B2 | 2/2015 | Tseng |
| 9,331,378 B2 | 5/2016 | Merlin et al. |
| 9,331,748 B2 | 5/2016 | Bernard et al. |
| 2008/0100527 A1 | 5/2008 | Rahim |
| 2009/0091501 A1 | 4/2009 | Mizoroki et al. |
| 2009/0174556 A1 | 7/2009 | Horne et al. |
| 2009/0295526 A1 | 12/2009 | Mikami et al. |
| 2011/0068178 A1 | 3/2011 | Gebhart |
| 2011/0128125 A1 | 6/2011 | Kai et al. |
| 2012/0071089 A1 | 3/2012 | Charrat et al. |
| 2012/0105211 A1 | 5/2012 | Rezayee et al. |
| 2012/0238899 A1 | 9/2012 | Bacquet et al. |
| 2013/0257599 A1 | 10/2013 | Tseng |
| 2013/0321230 A1 | 12/2013 | Merlin et al. |
| 2014/0011461 A1* | 1/2014 | Bakalski .............. H04B 1/3805 455/78 |
| 2014/0038662 A1* | 2/2014 | Alberth, Jr. ............... H01P 1/18 455/550.1 |
| 2015/0063517 A1 | 3/2015 | Verlinden et al. |
| 2016/0197718 A1 | 7/2016 | Michel et al. |
| 2017/0169258 A1 | 6/2017 | Neffe et al. |
| 2018/0034621 A1 | 2/2018 | Hueber et al. |

OTHER PUBLICATIONS

Gebhart, M. et al.; "Properties of a Test Bench to Verify Standard Complaince of Proximity Transponders"; Communication Systems, Networks and Digital Signal Processing; 5 pgs.; Jul. 2008.

Gebhart, M. et al.; "Design of 1156 MHz Smartcard stickers with Ferrite for Payment and Authentication"; Near Field Communication; pp. 59-64; Feb. 2011.

Gebhart, Michael et al.; "Active Load Modulation for Contactless Near-Field Communication"; 6 pgs.; Jul. 14, 2012.

Stark, Michael et al.; "Phase-Synchronicity in Active Load Modulation for NFC and Proximity"; 5th Int. Workshop on Near Field Communication (NFC), ETH Zurich, Switzerland, pp. 1-27; Feb. 5, 2013.

Stark, Michael et al.; "How to guarantee Phase-Synchronicity in Active Load Modulation for NFC and Proximity"; pp. 1-6; Feb. 5, 2013.

European Search Report, 13160128.8, Apr. 9, 2014.

Extended European Search Report for Counterpart Patent Appl. No. 17183057.3 dated (Dec. 1, 2017).

Extended European Search Report for related Patent Appl. No. 17182588.8 dated (Dec. 6, 2017).

Advisory Action for related U.S. Appl. No. 15/224,925 dated (Feb. 22, 2018).

\* cited by examiner

METHOD AND SYSTEM TO MEASURE THE PHASE OFFSET BASED ON THE FREQUENCY RESPONSE IN A NFC SYSTEM

FIELD

The described embodiments relate generally to methods and systems for NFC (near field communication), and more particularly to methods and systems for measuring the phase offset based on the frequency response in a near field communication (NFC) system.

BACKGROUND

The use of Near Field Communication (NFC) is becoming common place in applications such as contactless payment systems, security access systems, etc. A typical NFC based system consists of a NFC reader (e.g., Point of Sale terminal) and a NFC device, typically a NFC enabled card or a mobile phone.

Furthermore, a NFC device typically can be configured for either passive load modulation (PLM) or active load modulation (ALM). While, ALM is typically more complex than PLM, components for implementing ALM in a transponder (e.g., a mobile device) can be more compact and, because the transponder utilizes a power source to generate a magnetic field rather than just modulate a magnetic field created by a reader, an ALM transponder can have greater communication distance than a PLM transponder.

In order to perform a transaction using a NFC enabled device and a NFC device in reader mode, the NFC enabled device is brought near the NFC device in reader mode. The communication between the NFC enabled device and the NFC device in reader mode may fail if the NFC device in reader mode fails to properly demodulate the signal from the NFC enabled device. Such failures may occur if the NFC enabled device is not properly aligned with the NFC device in reader mode or if the NFC enabled device is not within a certain distance range from the NFC device in reader mode.

Such failures and other issues can be significantly reduced if there is tuning of the phase offset for active load modulation (ALM) in a NFC enabled device. Therefore, it is desirable to have methods and systems for measuring and compensating the phase offset for ALM in a near field communication (NFC) system.

SUMMARY

The present invention provides for a method to measure the phase offset caused by a matching network and antenna (due to, for example, process and component spread) such that the respective phase offset can be compensated. The present invention also provides for a method to compensate for the phase offset caused by a matching network and antenna (due to, for example, process and component spread) by first measuring the respective phase offset.

The present invention provides for a method for compensating phase offset caused by a matching network and antenna of a communications device, the method comprising: (a) generating a mapping that correlates phase offset with a characteristic parameter; (b) measuring the characteristic parameter for the communications device; (c) using the measured characteristic parameter and the mapping to determine a phase offset for the communications device; and (d) using the determined phase offset to compensate for the phase offset caused by the matching network and antenna of the communications device.

In some embodiments, the characteristic parameter is a resonance peak frequency for a signal that is either received or transmitted by the communications device.

In some embodiments, a reader device or a counterpart communications device transmits a carrier signal to the communications device. The communications device responds actively by transmitting back to the reader device or the counterpart communications device a modulated carrier signal. The phase offset is a phase difference between the carrier signal and the modulated carrier signal.

In some embodiments, the method further comprises: using the determined phase offset to adjust a phase configuration of the communications device; modulating a carrier signal with the adjusted phase configuration using active load modulation (ALM); and transmitting the modulated carrier signal from the communications device for inductive coupling.

In some embodiments, the characteristic parameter is associated with a signal that is either received or transmitted by the communications device.

In some embodiments, the characteristic parameter comprises one or more combination of the following features: a resonance frequency peak for the signal, an amplitude peak of a frequency response for the signal, an amplitude or a combination of amplitudes at specific frequencies for the signal, a notch of a frequency response for the signal, a bandwidth of the matching network and antenna, and a specific shape of a frequency response for the signal.

In some embodiments, the phase offset depends on production parameters for a printed circuit board (PCB) and a component.

In some embodiments, the communications device is a near field communication (NFC) communications device.

In some embodiments, the method is part of a production flow.

In some embodiments, the mapping that correlates phase offset with the characteristic parameter is generated by measuring or analyzing in simulation the phase offset by sweeping one or more of the following parameters: front end discrete component values, temperature of components, printed circuit board (PCB), and/or antenna, and PCB production variation.

In some embodiments, the mapping that correlates phase offset with the characteristic parameter is stored as: a function, and/or a mapping table.

In some embodiments, the mapping that correlates phase offset with the characteristic parameter is stored as: a multi-dimensional mapping table comprising one or more combination of the following features: the resonance peak frequency for the signal, the amplitude peak of the frequency response for the signal, the amplitude or a combination of amplitudes at specific frequencies for the signal, the notch of the frequency response for the signal, the bandwidth of the matching network and antenna, and the specific shape of the frequency response for the signal.

The present invention also provides for a method for measuring a phase offset caused by a matching network and antenna of a communications device, the method comprising: (a) transmitting a signal from the communications device to a reader device or a counterpart communications device; (b) determining a measured characteristic parameter for the signal; and (c) using the measured characteristic parameter to determine the phase offset caused by the matching network and antenna.

In some embodiments, the measured characteristic parameter is a resonance peak frequency for the signal.

In some embodiments, the resonance peak frequency is determined by: varying over a range of frequencies for the signal transmitted from the communications device, and measuring a voltage at the reader device or the counterpart communications device that corresponds to each of the signal frequency.

In some embodiments, the measured characteristic parameter is comprising of one or more combination of the following features: a resonance frequency peak for the signal, an amplitude peak of a frequency response for the signal, an amplitude or a combination of amplitudes at specific frequencies for the signal, a notch of a frequency response for the signal, a bandwidth of the matching network and antenna, and a specific shape of a frequency response for the signal.

In some embodiments, the method further comprises: using the measured characteristic parameter and a mapping to determine a phase offset for the communications device, wherein the mapping correlates the phase offset with the measured characteristic parameter, and using the determined phase offset to compensate for the phase offset caused by the matching network and antenna of the communications device.

The present invention further provides for a method for measuring a phase offset caused by a matching network and antenna of a communications device, the method comprising: (a) receiving, by the communications device, a signal from a reader device; (b) determining a measured characteristic parameter for the signal; and (c) using the measured characteristic parameter to determine the phase offset caused by the matching network and antenna.

In some embodiments, the measured characteristic parameter is a resonance peak frequency for the signal.

In some embodiments, the resonance peak frequency is determined by: varying over a range of frequencies for the signal transmitted from the reader device and received by the communications device, recording a received signal strength indicator (RSSI) value at the communications device for the range of frequencies for the signal received by the communications device, and identifying a resonance peak frequency from a maximum RSSI value.

The present invention further provides for a system capable of carrying out each of the methods described herein.

The present invention has one or more of the following advantages: (1) The invention can be a cost and time efficient method to quantify phase offset contribution due to matching network and antenna. (2) There is a reduction of eBOM (engineering bill of materials) as components with higher tolerance can be used for (antenna and matching circuitry). (3) The invention can avoid costly resonance tuning in customer production. (4) The invention can increase robustness in communication stability (and avoid zones of no communication) with critical readers already established in the market only supporting envelope detection. (5) The invention can enable certification of standards that use readers based on receivers with envelope detection. (6) The invention can increase user experience by ensuring consistent performance over production and system conditions. (7) The invention can enable recovery mechanisms. (8) The invention can allow phase characteristics for specific cases (such as protocol, application, and the like). (9) The invention can compensate IC behavior (PVT). (Note: IC denotes integrated circuit. PVT denotes process, voltage and temperature.)

The above summary is not intended to represent every example embodiment within the scope of the current or future Claim sets. Additional example embodiments are discussed within the Figures and Detailed Description below.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Representative devices and methods according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other embodiments are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Figure 1:
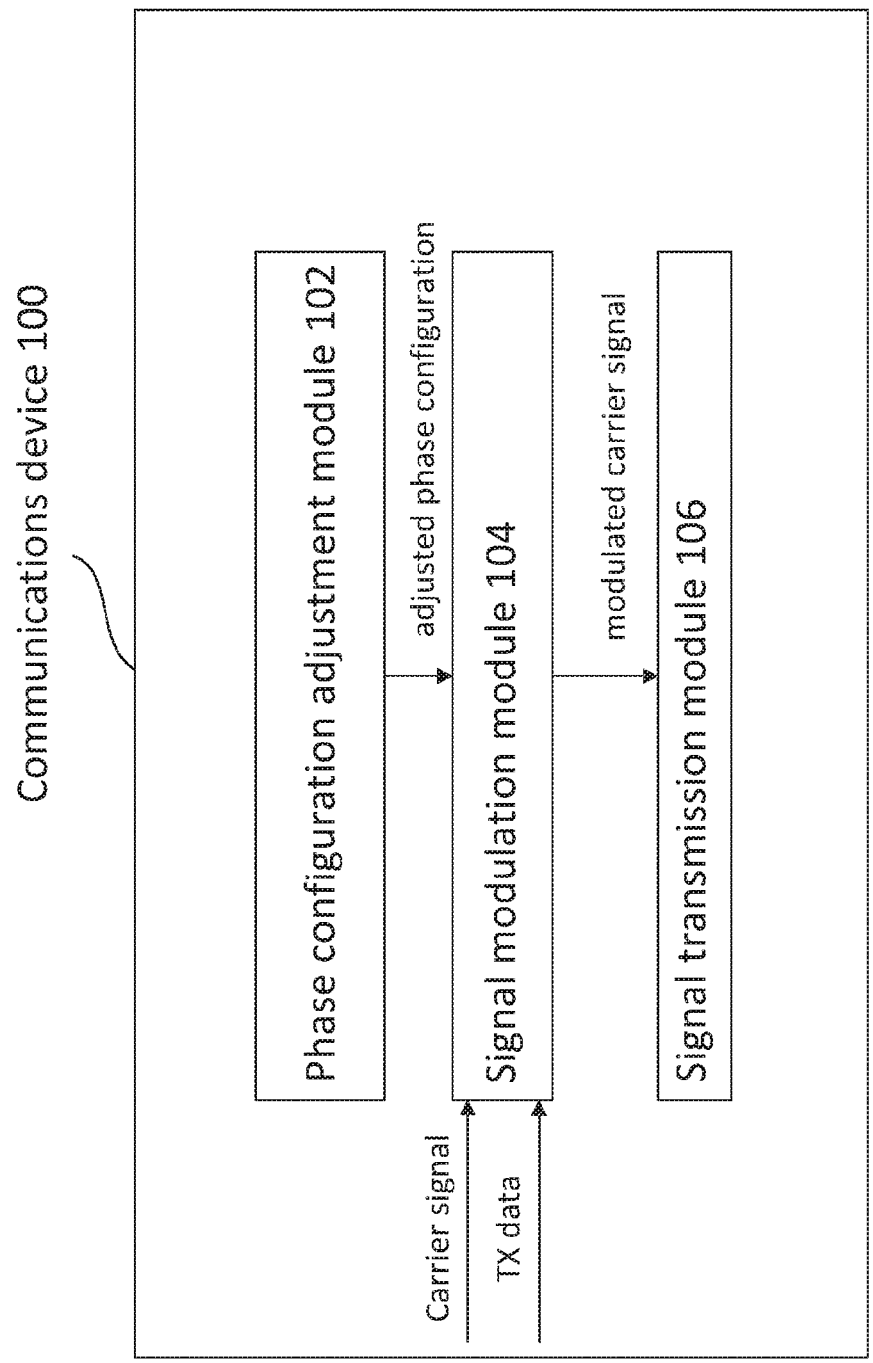
FIG. 1 shows a functional block diagram of a communications device in accordance with an embodiment of the invention.

FIG. 1 is a functional block diagram of a communications device 100 in accordance with an embodiment of the invention. In the embodiment depicted in FIG. 1, the communications device communicates via inductive coupling. The communications device may include a phase configuration adjustment module 102, a signal modulation module 104, and a signal transmission module 106. The communications device may be an integrated circuit (IC) device. In some embodiments, the communications device is implemented in a handheld computing system or a mobile computing system, such as a mobile phone. The communications device may be a near field communications (NFC) device that utilizes inductive coupling to communicate. In some embodiments, the communications device is implemented as an RF transponder compatible with the International Organization for Standardization (ISO)/the International Electrotechnical Commission (IEC) 14443 standard. Although the illustrated communications device is shown with certain components and described with certain functionality herein, other embodiments of the communications device may include fewer or more components to implement the same, less, or more functionality.

In the embodiment depicted in FIG. 1, the phase configuration adjustment module 102 is configured to adjust a phase configuration of the communications device in response to at least one system or environmental parameter. The phase configuration of the communications device may reflect an input/output phase behavior of the communications device. For example, the phase configuration of the communications device may be a relative phase setting between the received signal phase and the transmitted carrier phase of the response. Different readers or communications devices in reader-mode (e.g., readers of different manufacturers, readers of different models, readers of different types) may have different antennas, different matching networks, and different relative locations with respect to the communications device can impact the channel and thus the channel phase between the communications device and the reader/the communications device in reader-mode. Adjusting the phase configuration based on one or more system or environmental parameters to achieve a phase setting with good signal noise ratio (SNR) can provide robust communications across different readers and different inductive coupling positions.

The phase configuration adjustment module 102 may be configured to adjust the transmission carrier phase configuration of the communications device 100 before a transmission of a data frame or adjust the transmission carrier phase configuration of the communications device statically, dynamically, or "on-the-fly" during a transmission of a data frame. In some embodiments, the phase configuration adjustment module is configured to adjust the transmission carrier phase configuration of the communications device during or after production but before being distributed to consumers/end users. In some embodiments, the at least one system or environmental parameter is obtained during a startup of the communications device or before each data frame transmission.

In the embodiment depicted in FIG. 1, the signal modulation module 104 is configured to modulate a carrier signal with the adjusted phase configuration using active load modulation (ALM). The signal transmission module may include a clock recovery circuit and an analog transmitter.

In the embodiment depicted in FIG. 1, the signal transmission module 106 is configured to transmit the modulated carrier signal from the communications device for inductive coupling. The signal transmission module may include an induction type antenna such as a loop antenna.

In some embodiments, the communications device 100 is an active load modulation (ALM) device. In such embodiments, the signal transmission module can be configured to generate its own magnetic field for transmitting the outgoing RF using a current source, which results in greater communications distances compared with passive load modulation (PLM) systems. When the communications device and a corresponding reader or communications device in reader-mode both generate a magnetic field, the inductive coupling between the communications device and the corresponding reader/communications device in reader-mode can be affected by one or more system or environmental parameters. Consequently, the magnetic fields may be misaligned because of one or more system or environmental parameters. The misalignment in magnetic fields can decrease the signal strength in the amplitude portion of the modulation, resulting in lower communications performance (e.g., lower SNR). Typically, in order to prevent the magnetic fields of an ALM device and a reader from becoming misaligned and interfering with one another (e.g., to maintain a constant phase during transmission), components with very low error-tolerance are used in the transponder. In the embodiment depicted in FIG. 1, a phase configuration of the communications device is adjusted in response to at least one system or environmental parameter. Because the phase configuration of the communications device is adjusted in response to at least one system or environmental parameter, components with greater error-tolerance can be used in the RFID device while still maintaining the desired phase arrangement during transmission. In addition, resonance tuning of devices in mass production can be reduced or even avoided. Further, the robustness in communications stability for certain types of readers/communications devices in reader-mode (e.g., reader devices based on envelope detection) can be improved. Additionally, user experience can be boosted by providing more consistent performance over various production, system, protocol, and application conditions. Further, variations in IC behavior due to PVT can be compensated for.

Figure 2:
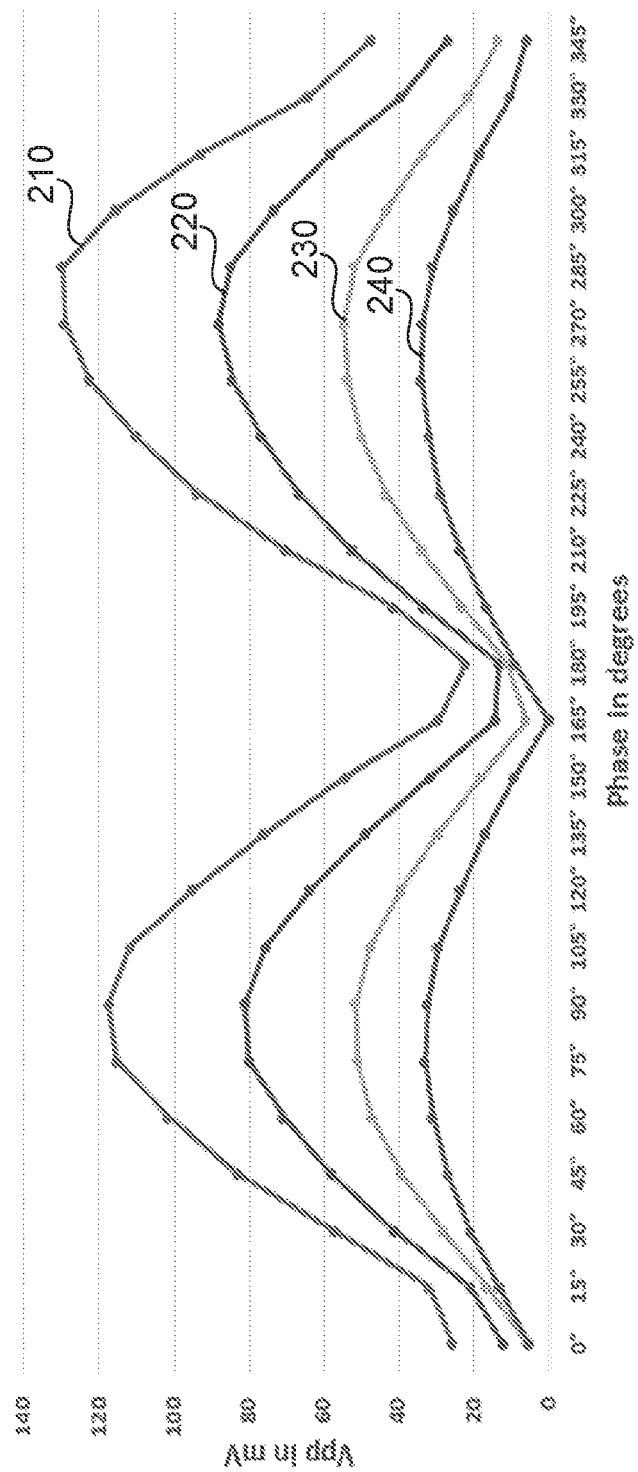
FIG. 2 shows a diagram of load modulation amplitudes versus example phase configurations of the communications device depicted in FIG. 1 under different inductive coupling conditions.

FIG. 2 depicts a diagram of load modulation amplitudes versus example phase configurations of the communications device depicted in FIG. 1 under different inductive coupling conditions. In the diagram of FIG. 2, the phase configurations of the communications device 100 are relative phase settings between the received signal phase versus the carrier phase in degrees and the load modulation amplitudes are in millivolts (mV). As depicted in FIG. 2, four curves 210, 220, 230, 240 represent four different inductive coupling conditions. For each inductive coupling condition, the load modulation amplitude initially increases with an increase in phase until a first peak (e.g., representing the positive load modulation amplitude), subsequently decreases with an increase in phase until a lowest point, then increases with an increase in phase until a second peak (representing the absolute value of the negative load modulation amplitude), and subsequently decreases with an increase in phase. However, for different inductive coupling conditions, peaks of the load modulation amplitudes occur at different phases. By statically or dynamically adjusting the phase, the load modulation amplitude is modified to achieve a high signal-to-noise ratio (SNR) and/or dynamic range at the reader device across a respective inductive coupling conditions and environmental parameters.

Figure 3:
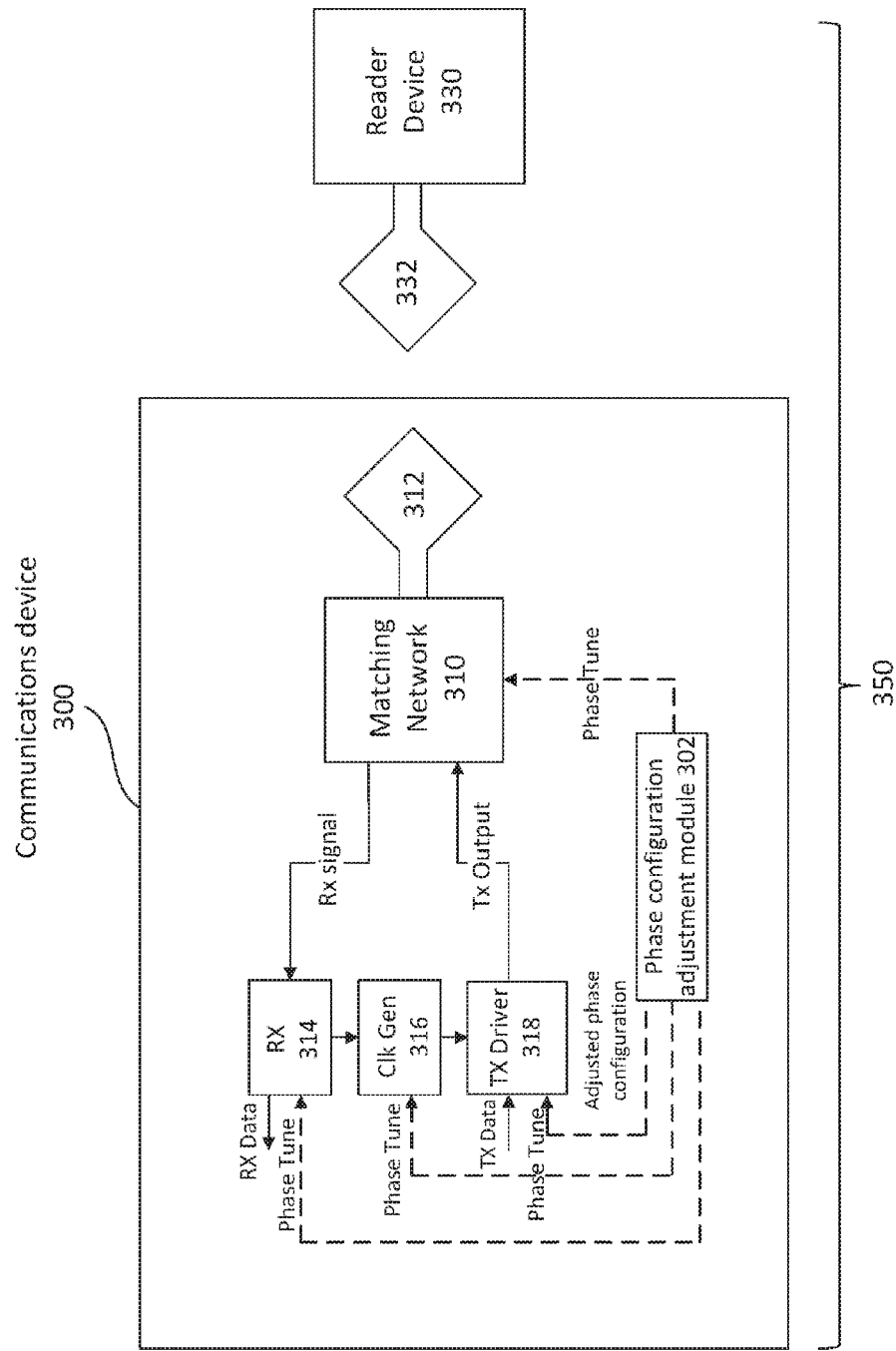
FIG. 3 shows an embodiment of the communications device depicted in FIG. 1 with a corresponding reader device to form an inductively coupled communications system.

FIG. 3 depicts an embodiment of the communications device 100 depicted in FIG. 1 that can be used with a corresponding reader or communications device in reader-mode 330 to form an inductively coupled communications system 350. In some embodiments, corresponding device 330 can be a dedicated reader device. In some embodiments, corresponding device 330 can be a communications counterpart device (as an example: a mobile phone). In some embodiments, corresponding device 330 can be a communications counterpart device (as an example: a mobile phone) operating in reader mode. In the embodiment depicted in FIG. 3, a communications device 300 includes a phase configuration adjustment module 302, a matching network 310 that is coupled to an antenna 312, an analog receiver "RX" 314, a clock generation circuit 316, and an analog transmitter "TX" 318. The antenna may be an induction type antenna such as a loop antenna. The clock generation circuit generates a clock that is synchronous to the received clock and thus synchronous to the carrier sent out by the reader or communications device in reader-mode. In an example operation of the communications device, a radio-frequency (RF) signal is received by the antenna via inductive coupling from an antenna 332 of the corresponding reader or communications device in reader-mode and is passed to the analog receiver to convert the RF signal into a digital signal. A signal is generated from the RF signal by the clock generation circuit and is used to produce an outgoing RF signal at the analog transmitter, which is transmitted via inductive coupling using the antenna. The communications device 300 depicted in FIG. 3 is one possible embodiment of the communications device 100 depicted in FIG. 1. However, the communications device depicted in FIG. 1 is not limited to the embodiment shown in FIG. 3.

In some embodiments, the communications device 300 is an active load modulation (ALM) device. In these embodiments, the antenna can be configured to generate its own magnetic field for transmitting the outgoing RF using a current source, which can result in greater communications distances than PLM devices. In the embodiment depicted in FIG. 3, a phase configuration of the communications device is adjusted in response to at least one system or environmental parameter. Because the phase configuration of the communications device is adjusted in response to at least one system or environmental parameter, components with greater error-tolerance can be used in the RFID device while still maintaining the desired phase arrangement during transmission. The corresponding reader/communications device in reader-mode is capable of demodulating the signal because the amplitude of the RF signal captured from the communications device has sufficient SNR and dynamic range.

The phase configuration adjustment module 302 can adjust phase configurations in various components of the communications device. The phase configuration adjustment module can adjust phase configurations in various components of the communications device statically, dynamically, or on-the-fly. The phase configuration adjustment module also can adjust phase configurations in various components of the communications device at the time of production and before distribution to consumers/end users. In the embodiment depicted in FIG. 3, the phase configuration adjustment module can adjust phase configurations in the analog receiver "RX" 314, the clock generation circuit 316, and/or the analog transmitter "TX" 318. Although the illustrated phase configuration adjustment module is shown as being separate from the analog receiver, the clock generation circuit, and the analog transmitter, in some embodiments, the phase configuration adjustment module is implemented within the analog receiver, the clock generation circuit, and/or the analog transmitter.

In some embodiments, the phase configuration adjustment module 302 adjusts the phase configuration of the analog receiver "RX" 314. In some embodiments, the phase configuration adjustment module 302 adjusts the phase configuration of the clock generation circuit 316. In some embodiments, the phase configuration adjustment module 302 adjusts the phase configuration of the analog transmitter "TX" 318.

Active load modulation (ALM) is state of the art for all mobile NFC solution in the market. In one embodiment, ALM is an actively sending of 13.56 MHz signal modulated according to standards for Type A/B/F. This grants a huge benefit in generated signal strength and allows for the use of smaller antennas by fulfilling the required standards like NFC Forum, ISO 14443, EMVCo, etc. with respect to load modulation amplitude parameter.

A dedicated initial phase can be defined for the card response for all cases of ALM. The initial phase setting can be used to optimize the load modulation amplitude as shown in FIG. 2 for different coupling positions shown as "210", "220", "230", and "240". In FIG. 2, the x-axis can represent the initial phase setting in degrees (i.e., phase of ALM versus TX CW (transmitter carrier wave) signal phase). FIG. 2 shows the load modulation amplitude peaking for some phase values. Therefore, in one embodiment, the phase can be used to optimize the load modulation amplitude.

There are many reference communication counterparts in the field (and certification test) which are strongly amplitude dependent, e.g. some FeliCa readers and older payment terminals. For these readers, which are strongly amplitude dependent, it can be shown that only a small range of phase results in a passing communication. Therefore, adjusting the phase to optimize the load modulation amplitude can be a great help for use with these counterparts (e.g. some FeliCa readers and older payment terminals).

The transmitter (TX) phase (phase relation from reader field as seen on the RX and the phase of the carrier at the TX) of the NFC system depends on multiple system and/or environmental parameters/conditions (e.g., field strength, detuning/coupling condition, antenna geometries, IC (PVT) (integrated circuit—process, voltage and temperature), matching network (topology, . . . ), protocol, data-rate, retransmission, reconfiguration, timings, applications, etc.

The phase offset/variation caused by antenna and matching network depends on production parameters for the PCB (printed circuit board), components, etc. Consequently, this contribution needs to be quantified and considered part by part. Hence, this calls for a method that allows quantification of the respective phase offset which is: (1) fast, (2) low cost, (3) does not require complex, costly, highly sophisticated measurement and/or analysis equipment/techniques, (4) robust, (5) highly repeatable, and (6) highly reproducible.

To quantify the phase offset/variation caused by antenna and matching network, a method can use a simple process based on measurement of specific features of the frequency response of the TX (transmitter) and RX (receiver) paths, and thus there is no need for a costly (and probably inaccurate) direct measurement of the phase shift.

In the following, the "phase offset" or "phase shift" is the phase difference between the signal the reader transmits (i.e., the RF (radio frequency) carrier), and the responding signal from the card device which is actively transmitted back to the reader.

The phase offset (variation) caused by the matching network/antenna can be quantified and used for compensation of a part dependent variation in two main steps: (1) preparation, and (2) application. In the preparation step, the phase offset is assessed per a characteristic parameter to generate an offset mapping. In the application step, the phase offset is determined by performing a simple measurement of the characteristic parameter in the volume production, and using the offset mapping from the preparation step.

An analysis of the RX and/or TX frequency response can be performed. The RX/TX frequency response reflects the phase shift for the matching network. Although the phase shift at the frequency of the carrier is of actual interest, the quantification is done by aggregating easily measurable features of the signal rather a dedicated phase measurement.

Next, there is a "pre-processing" step to prepare for the volume production. The analysis outcome of the RX/TX frequency response is aggregated and prepared for applying a compensation in a production flow.

The phase shift (from RX and/or TX frequency response) is analyzed in simulations/measurements sweeping parameters that are expected to vary. For example, these parameters can include: (1) front-end discrete component values covered by Monte Carlo simulations, temperature of components/PCB/antenna, (3) PCB production variation, and (4) others.

Then correlation of phase shift to measured characteristic parameters is performed. In this step, specific features, patterns, parameters captured by the measurement system are correlated to the phase shift at the frequency of interest. These features/patterns/parameters might be one or a combinations of the following:

(1) a resonance frequency peak for RX and/or TX,
(2) an amplitude peak for RX and/or TX,
(3) an amplitude or a combination of amplitudes at specific frequencies (for RX and/or TX),
(4) a notch (for RX and/or TX),
(5) bandwidth of the matching/antenna circuitry or system,
(6) a specific shape,
(7) etc.

Depending on the correlation of one or more of the parameters, depending on the actual matching network parameters and/or topology and/or the antenna parameters, per target platform a meaningful set of features/patterns/parameters (from the above set) can be used as parameters in a production process.

Then the phase shifts per measured parameters are stored as a function and/or a mapping table. In one embodiment, this might be a function listing phase offsets as a function of one or a combination of parameters mentioned above (e.g., the frequency of the RX or TX resonance frequency peak). In one embodiment, this might be a table listing phase offsets depending on one or a combination of parameters mentioned above (e.g., the frequency of the RX or TX resonance frequency peak). In one embodiment, this might be a multi-dimensional look-up table with frequencies of RX and TX resonance frequency peaks and/or position of a notch.

This function and/or mapping that is generated in preparation of a production test by e.g., simulation, characterization of pre-volume samples, etc. is considered a correction rule.

Figure 4:
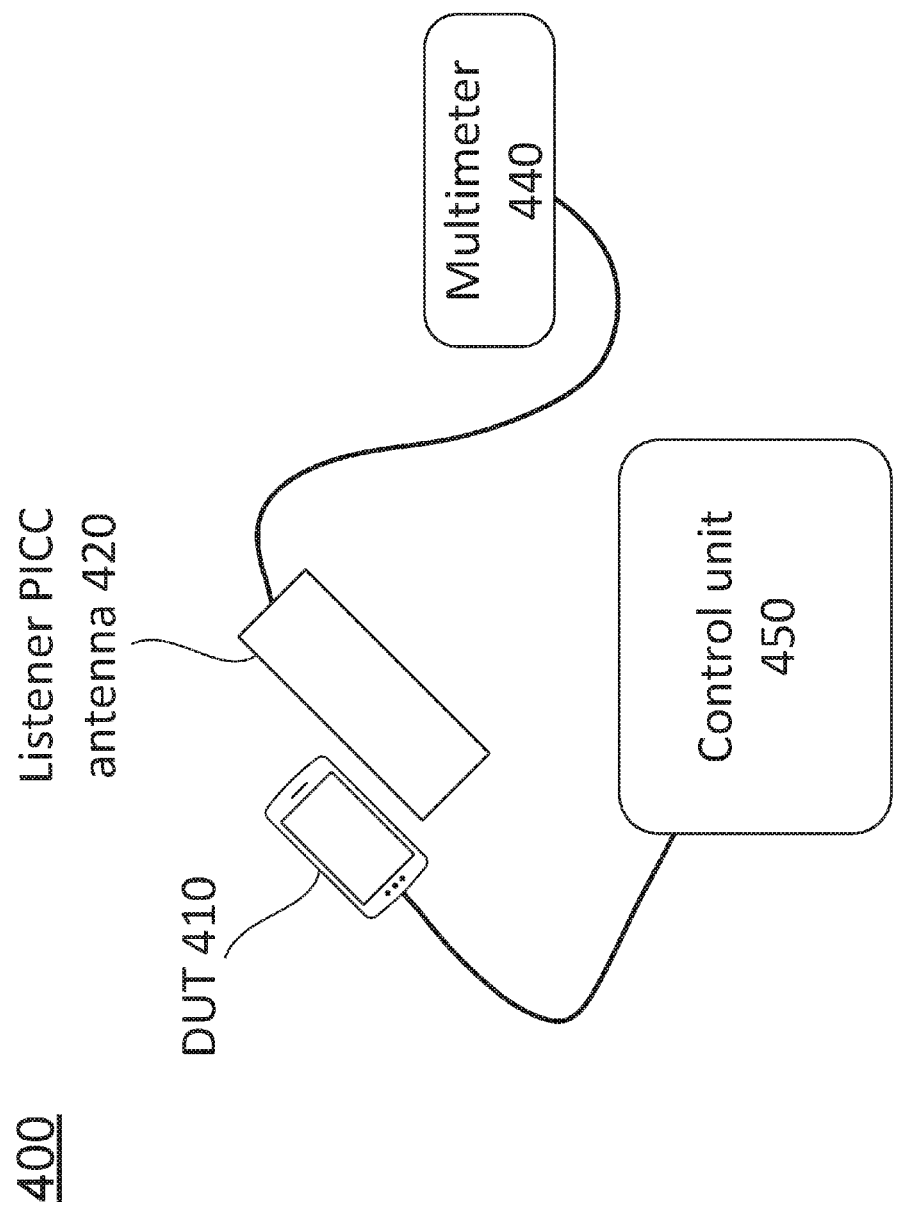
FIG. 4 shows an embodiment of an OTA (over the air) set-up to measure TX (transmitter) resonance frequency, which can then be used to determine the phase offset.
Figure 5:
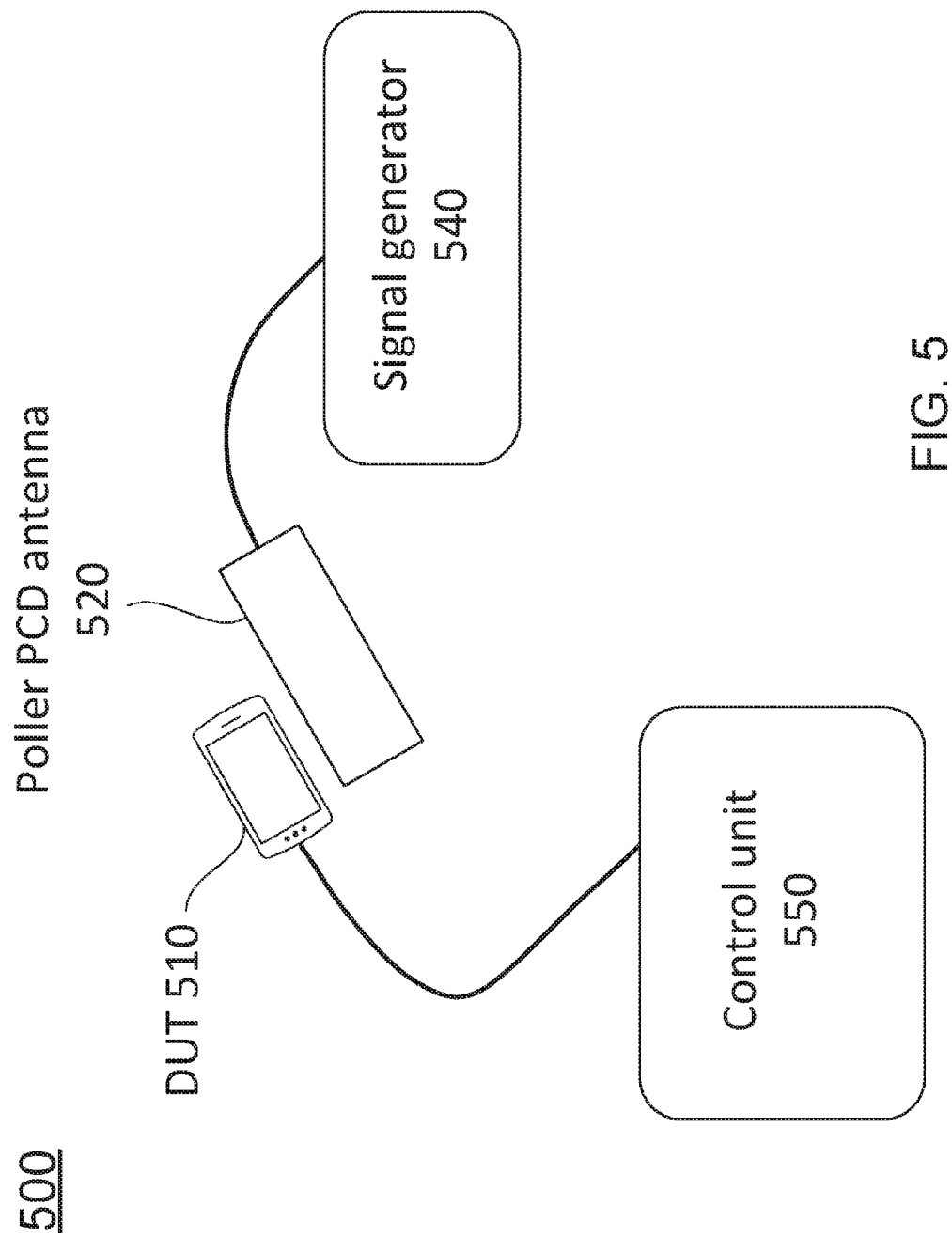
FIG. 5 shows an embodiment of an OTA (over the air) set-up to measure RX (receiver) resonance frequency, which can then be used to determine the phase offset.

Next, there is the application step of the phase offset estimation. In this step, which is applied in (volume) production, the phase shifts generated from the correlation (of phase shift to measured characteristic parameters), which are described above, are used to compensate the phase shift per part by quantifying one or multiple parameters by measurements. FIGS. 4 and 5 will show two specific examples of how this application step can be carried out.

FIG. 4 shows an embodiment of an OTA (over the air) set-up to measure TX (transmitter) resonance frequency, which can then be used to determine the phase offset. The system 400 comprises: a device under test (DUT) 410, a control unit 450, a listener PICC (proximity inductive coupling card) antenna 420, and a multimeter 440. Listener PICC antenna 420 is in electrical communication with multimeter 440. Device under test (DUT) 410 is in electrical communication with control unit 450. Device under test (DUT) 410 communicates with listener PICC antenna 420 over the air (using their antennas). In one embodiment, device under test (DUT) 410 can be a communications device. For example, the communications device may be implemented in a handheld computing system. In some embodiments, the communications device is implemented in a mobile computing system, such as a mobile phone. In one embodiment, listener PICC antenna 420 can be a reader or a communications device in reader-mode.

In some embodiments, the OTA set-up operates as follows: (1) set first frequency $f_1$ on device under test (DUT) 410 using control unit 450 (for example one may start at $f_1$=13 MHz), (2) turn on TX with unmodulated carrier, (3) measure voltage at listener PICC antenna 420 on multimeter 440, (4) increase frequency $f_1$ by a given increment (for example: +50 kHz), (5) measure voltage at listener PICC antenna 420 on multimeter 440, (6) repeat the aforementioned steps (4)-(5) until a final frequency step (which, for example, can be $f_1$+300 KHz), (7) measure voltage at the listener PICC antenna 420 on multimeter 440, and (8) calculate/identify resonance (or resonant) peak frequency (e.g., >+2 lsb higher than other $V_{listener-measurements}$). In some embodiments, the OTA set-up can operate in an optimized flow, as follows: (1) set first frequency $f_1$ on device under test (DUT) 410 using control unit 450, (2) turn on TX with unmodulated carrier, (3) measure DC (direct current) voltage at listener PICC antenna 420, (4) set next frequency (following binary search algorithm), (5) measure DC (direct current) voltage at listener PICC antenna 420, (6) perform 4 to 6 times iterations of the aforementioned steps (4)-(5), and (7) identify resonant (peak) frequency. This flow can be optimized because of the binary search algorithm. In some embodiments, other optimizing search algorithms can be used.

FIG. 5 shows an embodiment of an OTA (over the air) set-up to measure RX (receiver) resonance frequency, which can then be used to determine the phase offset. The system 500 comprises: a device under test (DUT) 510, a control unit 550, a Poller PCD (proximity coupling device) antenna 520, and a signal generator 540. Poller PCD antenna 520 is in electrical communication with signal generator 540. Device under test (DUT) 510 is in electrical communication with control unit 550. Poller PCD antenna 520 communicates with device under test (DUT) 410 over the air (using their antennas). In one embodiment, device under test (DUT) 510 can be a communications device. For example, the communications device may be implemented in a handheld computing system. In some embodiments, the communications device is implemented in a mobile computing system, such as a mobile phone. In one embodiment, Poller PCD antenna 520 can be a reader or a communications device in reader-mode.

In some embodiments, the OTA set-up operates as follows: (1) set signal generator 540 to first frequency $f_1$ (for example one may start at $f_1$=13 MHz, and set signal level>4 A/m; $V_{sig\_gen}$>1.5V), (2) turn on device under test (DUT) 510 in card mode, (3) record RSSI (received signal strength indicator) value on device under test (DUT) 510 using control unit 550, (4) increase frequency by 1 increment (+50 kHz), (5) record RSSI value, (6), repeat the aforementioned steps (4)-(5) until a final frequency step (which, for example, can be $f_1$+300 kHz), (7) set last frequency step at $f_1$+300 kHz, (8) record RSSI value, and (9) identify resonant peak frequency from maximum RSSI (e.g., >+2 lsb higher than other RSSI values). In some embodiments, the OTA set-up can operate in an optimized flow utilizing binary search algorithm. In some embodiments, other optimizing search algorithms can be used.

Figure 6:
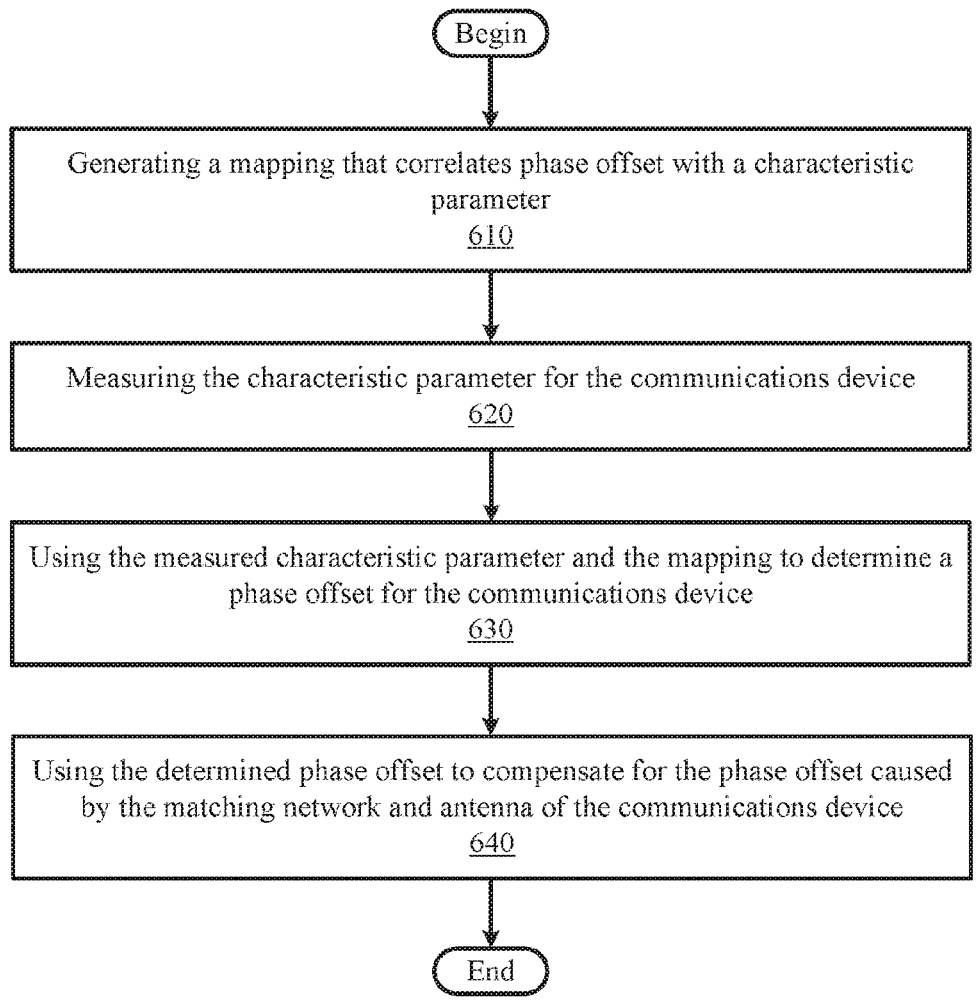
FIG. 6 shows an embodiment of a method for compensating phase offset caused by a matching network and antenna of a communications device.

FIG. 6 shows a flow chart of method steps for compensating phase offset caused by a matching network and antenna of a communications device. As shown in FIG. 6, the method 600 begins at step 610, where the method generates a mapping that correlates phase offset with a characteristic parameter. Then, the method proceeds to step 620. In step 620, the method measures the characteristic parameter for the communications device. Next, at step 630, the method uses the measured characteristic parameter and the mapping to determine a phase offset for the communications device. Finally, at step 640, the method uses the determined phase offset to compensate for the phase offset caused by the matching network and antenna of the communications device.

Figure 7:
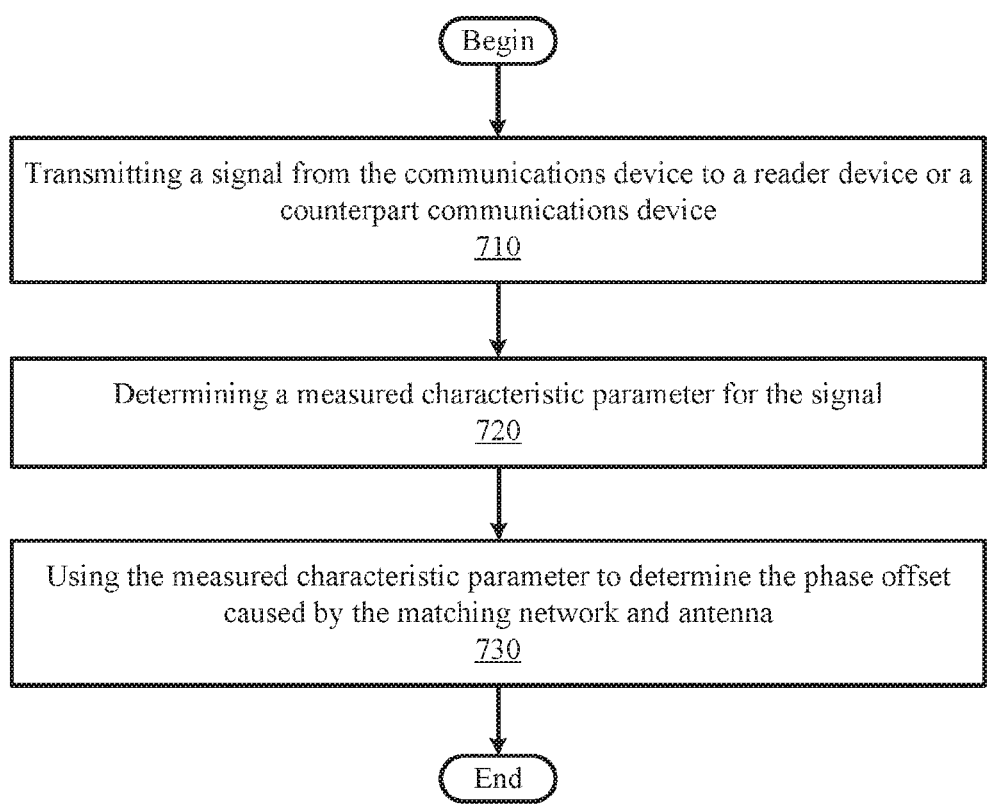
FIG. 7 shows an embodiment of a method for measuring a phase offset caused by a matching network and antenna of a communications device.

FIG. 7 shows a flow chart of method steps for measuring a phase offset caused by a matching network and antenna of a communications device. As shown in FIG. 7, the method 700 begins at step 710, where the method transmits a signal from the communications device to a reader device or a counterpart communications device. Then, the method proceeds to step 720. In step 720, the method determines a measured characteristic parameter for the signal. Finally, at step 730, the method uses the measured characteristic parameter to determine the phase offset caused by the matching network and antenna.

Figure 8:
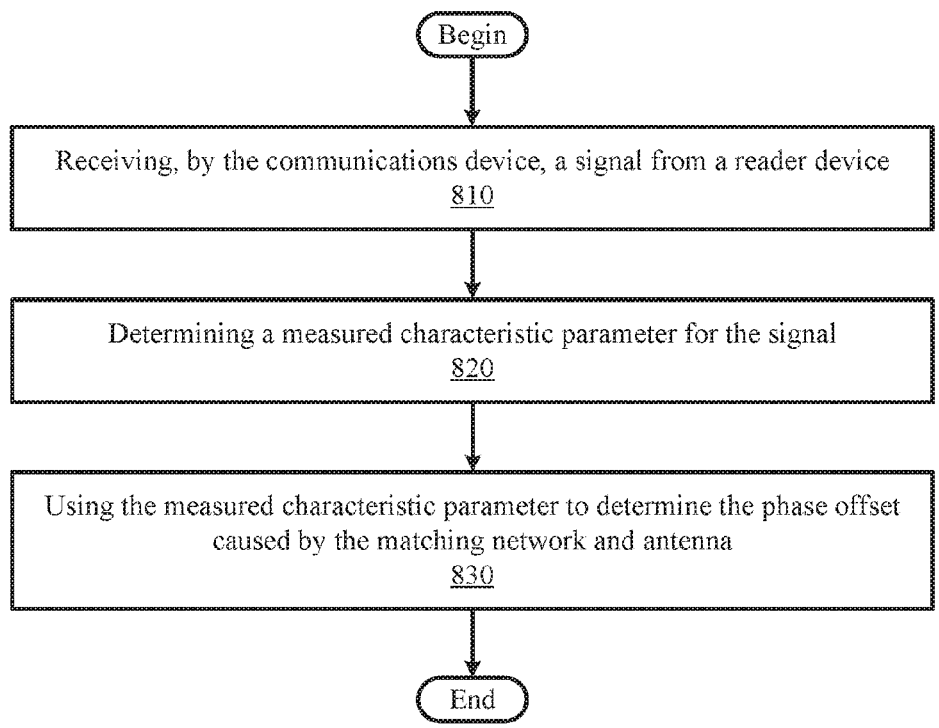
FIG. 8 shows another embodiment of a method for measuring a phase offset caused by a matching network and antenna of a communications device.

FIG. 8 shows a flow chart of method steps for measuring a phase offset caused by a matching network and antenna of a communications device. As shown in FIG. 8, the method 800 begins at step 810, where the method receives, by the communications device, a signal from a reader device. Then, the method proceeds to step 820. In step 820, the method determines a measured characteristic parameter for the signal. Finally, at step 830, the method uses the measured characteristic parameter to determine the phase offset caused by the matching network and antenna.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for compensating phase offset caused by a matching network and antenna of a communications device, the method comprising: generating a mapping that correlates phase offset with a characteristic parameter, wherein the characteristic parameter is associated with a signal that is either received or transmitted by the communications device, and wherein the characteristic parameter is comprising of one or more combination of the following features: a resonance peak frequency for the signal, an amplitude peak of a frequency response for the signal, an amplitude or a combination of amplitudes at specific frequencies for the signal, a notch of a frequency response for the signal, a bandwidth of the matching network and antenna, a specific shape of a frequency response for the signal; measuring the characteristic parameter for the communications device; using the measured characteristic parameter and the mapping to determine a phase offset for the communications device; and using the determined phase offset to compensate for the phase offset caused by the matching network and antenna of the communications device.

2. The method of claim 1, wherein the characteristic parameter is the resonance peak frequency for the signal.

3. The method of claim 1, wherein:
   a reader device or a counterpart communications device transmits a carrier signal to the communications device,
   the communications device responds actively by transmitting back to the reader device or the counterpart communications device a modulated carrier signal, and
   the phase offset is a phase difference between the carrier signal and the modulated carrier signal.

4. The method of claim 1 further comprises:
   using the determined phase offset to adjust a phase configuration of the communications device;
   modulating a carrier signal with the adjusted phase configuration using active load modulation (ALM); and
   transmitting the modulated carrier signal from the communications device for inductive coupling.

5. The method of claim 1, wherein the phase offset depends on production parameters for a printed circuit board (PCB) and a component.

6. The method of claim 1, wherein the communications device is a near field communication (NFC) communications device.

7. A production flow comprising the method of claim 1.

8. The method of claim 1, wherein the mapping that correlates phase offset with the characteristic parameter is generated by measuring or analyzing in simulation the phase offset by sweeping one or more of the following parameters:
   front end discrete component values,
   temperature of components, printed circuit board (PCB), or antenna, PCB production variation.

9. The method of claim 1, wherein the mapping that correlates phase offset with the characteristic parameter is stored as:
   a function, or
   a mapping table.

10. The method of claim 1, wherein the mapping that correlates phase offset with the characteristic parameter is stored as: a multi-dimensional mapping table comprising of one or more combination of the following features: the resonance peak frequency for the signal, the amplitude peak of the frequency response for the signal, the amplitude or a combination of amplitudes at specific frequencies for the signal, the notch of the frequency response for the signal, the bandwidth of the matching network and antenna, the specific shape of the frequency response for the signal.

11. A method for measuring a phase offset caused by a matching network and antenna of a communications device, the method comprising: transmitting a signal from the communications device to a reader device or a counterpart communications device; determining a measured characteristic parameter for the signal, wherein the measured characteristic parameter is comprising of one or more combination of the following features: a resonance peak frequency for the signal, an amplitude peak of a frequency response for the signal, an amplitude or a combination of amplitudes at specific frequencies for the signal, a notch of a frequency response for the signal, a bandwidth of the matching network and antenna, a specific shape of a frequency response for the signal; using the measured characteristic parameter to determine the phase offset caused by the matching network and antenna.

12. The method of claim 11, wherein the measured characteristic parameter is the resonance peak frequency for the signal.

13. The method of claim 12, wherein the resonance peak frequency is determined by:
varying over a range of frequencies for the signal transmitted from the communications device, and
measuring a voltage at the reader device or the counterpart communications device that corresponds to each of the signal frequency.

14. The method of claim 11 further comprises:
using the measured characteristic parameter and a mapping to determine a phase offset for the communications device, wherein the mapping correlates the phase offset with the measured characteristic parameter,
using the determined phase offset to compensate for the phase offset caused by the matching network and antenna of the communications device.

15. A method for measuring a phase offset caused by a matching network and antenna of a communications device, the method comprising: receiving, by the communications device, a signal from a reader device; determining a measured characteristic parameter for the signal, wherein the measured characteristic parameter is comprising of one or more combination of the following features: a resonance peak frequency for the signal, an amplitude peak of a frequency response for the signal, an amplitude or a combination of amplitudes at specific frequencies for the signal, a notch of a frequency response for the signal, a bandwidth of the matching network and antenna, a specific shape of a frequency response for the signal; using the measured characteristic parameter to determine the phase offset caused by the matching network and antenna.

16. The method of claim 15, wherein the measured characteristic parameter is the resonance peak frequency for the signal.

17. The method of claim 16, wherein the resonance peak frequency is determined by:
varying over a range of frequencies for the signal transmitted from the reader device and received by the communications device,
recording a received signal strength indicator (RSSI) value at the communications device for the range of frequencies for the signal received by the communications device,
identifying a resonance peak frequency from a maximum RSSI value.

* * * * *